United States Patent
Bramson et al.

(10) Patent No.: US 7,365,467 B2
(45) Date of Patent: Apr. 29, 2008

(54) LOW NOISE STATOR WINDING HAVING A PHASE ANGLE SHIFT

(75) Inventors: Eric David Bramson, Ann Arbor, MI (US); Hanyang B. Chen, Ypsilanti, MI (US); Kirk E Neet, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 380 days.

(21) Appl. No.: 11/099,874

(22) Filed: Apr. 6, 2005

(65) Prior Publication Data

US 2006/0226727 A1   Oct. 12, 2006

(51) Int. Cl.
*H02K 3/00* (2006.01)

(52) U.S. Cl. .................... 310/180; 310/184
(58) Field of Classification Search ............. 310/179, 310/180, 184, 195, 198, 201–208
See application file for complete search history.

(56) References Cited

U.S. PATENT DOCUMENTS

| | | | |
|---|---|---|---|
| 4,807,821 A * | 2/1989 | Kim ..................... 310/184 |
| 6,285,107 B1 | 9/2001 | Sawada et al. |
| 6,373,164 B1 * | 4/2002 | Nishimura ............... 310/207 |
| 6,388,357 B1 * | 5/2002 | Tokumasu et al. ......... 310/198 |
| 6,417,592 B2 | 7/2002 | Nakamura et al. |
| 6,501,205 B1 * | 12/2002 | Asao et al. ............... 310/184 |
| 6,573,629 B1 | 6/2003 | Morimatsu |
| 6,710,495 B2 | 3/2004 | Lipo et al. |
| 6,727,625 B2 | 4/2004 | Ooiwa |
| 6,750,581 B2 | 6/2004 | Neet |
| 6,759,779 B2 | 7/2004 | Neet |
| 6,784,583 B2 | 8/2004 | Umeda |
| 6,800,974 B2 | 10/2004 | Shichijyo |
| 7,005,772 B1 * | 2/2006 | Frederick et al. ......... 310/179 |
| 2002/0135257 A1 | 9/2002 | Umeda |
| 2003/0011268 A1 | 1/2003 | Even et al. |
| 2004/0061400 A1 | 4/2004 | Fukushima et al. |
| 2004/0070305 A1 | 4/2004 | Neet |
| 2004/0083597 A1 | 5/2004 | Ooiwa |
| 2004/0135458 A1 | 7/2004 | Neet |
| 2004/0150284 A1 | 8/2004 | Umeda |

* cited by examiner

*Primary Examiner*—Dang Le
(74) *Attorney, Agent, or Firm*—Brinks Hofer Gilson & Lione (57) ABSTRACT

A stator for an electric machine includes a generally cylindrically-shaped stator core having a plurality of core teeth that define a plurality of core slots, the core slots extend between first and second ends of the stator core. A stator winding has a plurality of phases, N, each phase including at least one conductor having a plurality of slot segments housed in the core slots, the slot segments are alternately connected at the first and second ends by a plurality of end loop segments. At least one conductor has a slot segment that is switched with an adjacent conductor such that the conductor has an end loop segment having a pitch equal to N+1 and the end loop segment of the adjacent conductor has a pitch equal to N−1, wherein the end loop segments of the conductor and the adjacent conductor do not cross one another. The stator also reduces overall noise of an electric machine.

18 Claims, 13 Drawing Sheets

LOW NOISE STATOR WINDING HAVING A PHASE ANGLE SHIFT

FIELD OF THE INVENTION

The present invention relates generally to electric machines and, in particular, to a stator for an electric machine having a core and a winding.

BACKGROUND OF THE INVENTION

Electric machines, such as alternating current electric generators, or alternators are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a rotor attached to a generally cylindrical shaft that is rotatably mounted in the housing and is coaxial with the stator assembly. The stator assembly includes a plurality of wires wound thereon, forming windings. The stator windings are formed of slot segments that are located in the core slots and end loop segments that connect two adjacent slot segments of each phase and are formed in a predetermined multi-phase (e.g. three or six) winding pattern in the slots of the stator core.

The rotor assembly can be any type of rotor assembly, such as a "claw-pole" rotor assembly, which typically includes opposed poles as part of claw fingers that are positioned around an electrically charged rotor coil. The electric current in the rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing alternating electrical currents in the stator windings in a well known manner. The alternating electrical currents are then routed from the alternator to a distribution system for consumption by electrical devices or, in the case of an automotive alternator, to a rectifier and then to an automobile battery.

One type of device is a high slot fill stator, which is characterized by rectangular shaped conductors whose width, including any insulation fit closely to the width, including any insulation of the rectangular shaped core slots. High slot fill stators are advantageous because they are efficient and help produce more electrical power per winding than other types of prior art stators.

One disadvantage of a six phase high slot fill stator is that it usually includes a phase shift of thirty electrical degrees. The stator having a thirty electrical degree phase shift inherently has a high order of noise at the order which is equal to the number of phases times the number of rotor poles, because the phases conduct current at this order.

Another problem with an alternator having two rectified sets of three-phase windings displaced by thirty electrical degrees is the layout of the stator windings in the stator core. End loop segments in a stator having a unity pitch winding must cross one another. For example, a conductor exiting slot 1 turns and enters slot 7, while a wire exiting the neighboring slot, slot 2, turns and enters slot 8. Those end loop segments of those two conductors must cross. This is the case for all end loop segments of winding having a unity pitch. The winding geometry is determined so that the end loop segments nest in one another and the bundle of end loop segments remains compact so as to allow the rotor and stator to fit without interference. Complication is added into the winding process to interlace the windings in the transition areas between radial positions in the stator. This prevents enlargement of the winding end loop segments in the transition areas that would otherwise occur due to limitations in the nesting geometry of end loop segments that cross each other while transitioning from one layer to the next.

Accordingly, there is a need for a stator winding that provides a phase shift of other than thirty electrical degrees, thereby reducing the inherent noise of the stator and reducing the amount of crossing within the end loop segments of the conductors.

SUMMARY OF THE INVENTION

A stator for a dynamoelectric machine according to the present invention includes a generally cylindrically-shaped stator core having a plurality of circumferentially-spaced and axially-extending uniform and equally-spaced core teeth that define a plurality of circumferentially-spaced and axially-extending core slots in a surface thereof. The core slots extend between a first and a second end of the stator core. The stator also includes a multi-phase stator winding.

Each of the phases may include a pair of conductors that are connected in parallel. Each conductor includes a plurality of slot segments disposed in the core slots that are alternately connected at the first and second ends of the stator core by a plurality of end loop segments. The slot segments and likely the end loop segments of a high slot fill winding are typically rectangular in cross sectional shape. The end loop segments of the winding may be interlaced or cascaded. An interlaced winding includes a majority of end loops that connect a slot segment housed in one core slot and in one radial position with a slot segment housed in another core slot in a different radial position. In contrast, a cascaded winding includes a majority of end loop segments that connect a slot segment housed in one radial position of a core slot with another slot segment housed in the same radial position of another core slot. The term radial position, utilized herein, refers to the position of a slot segment housed in the core slots with respect to the other slot segments housed in the same core slot—i.e. the outermost slot segment housed in a core slot is defined as being located in the outermost radial position, the second outermost slot segment housed in a slot is defined as being located in the second outermost radial position, and so forth. The term conductor portion, utilized herein, is defined as being a portion of a conductor that includes at least three consecutive slot segments connected by at least two end loop segments. A cascaded winding is further defined as a winding including a plurality of conductor portions of all of the phases located in the same general circumferential location, wherein all of the conductor portions could be sequentially radially inserted from the central axis of the stator core.

In an aspect, each conductor having a different phase is connected separately such that the stator core has one slot per phase per pole. A first conductor has at least one end loop pitch of N+1 and may have at least one end loop pitch of N−1, where N is the number of slots that are spanned by that particular end loop segment. A second conductor, having a phase angle closest to the first conductor, has at least one end loop pitch of N−1 and may have at least one end loop pitch of N+1. At a specific circumferential location having end loop segment pitches equal to N+1 and N−1, the end loop segments of the first and second conductors do not cross one another.

In another aspect, half of the conductors within the stator winding are connected to one another in a delta or wye configuration and the other half of the conductors are connected to one another in a separate delta or wye configuration. Each terminal of the stator winding is connected to a diode pair.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
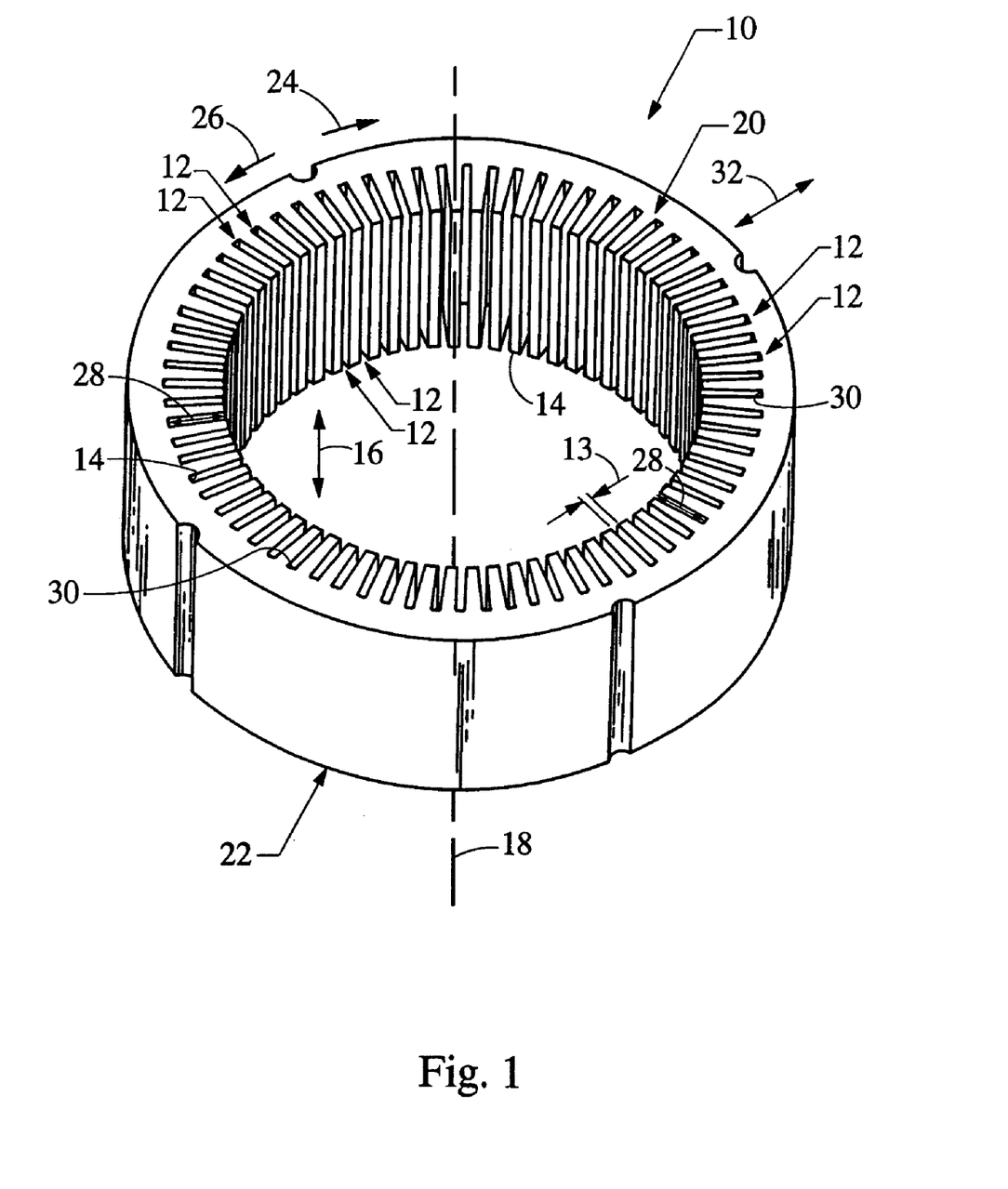
FIG. 1 is a perspective view of a stator core in accordance with the present invention prior to insertion of the stator winding.

Referring now to FIG. 1, a generally cylindrically-shaped stator core is indicated generally at 10. The stator core 10 includes a plurality of core slots 12 formed in a circumferential inner diameter 14 thereof. The core slots 12 extend in an axial direction, indicated by an arrow 16, parallel to a central axis 18 of the stator core 10 between a first end 20 and a second end 22 thereof. An axially upward direction is defined as moving toward the first end 20 of the stator core 10 and an axially downward direction is defined as moving toward the second end 22 of the stator core 10.

Preferably, the core slots 12 are equally spaced around the circumferential inner diameter 14 of the stator core 10. A circumferential clockwise direction is indicated by an arrow 24 and a circumferential counterclockwise direction is indicated by an arrow 26.

The core slots 12 define a radial depth 28, between ends 30 of the core slots 12 and the inner diameter 14 of the stator core 10. This radial depth 28 is along the radial direction. The core slots 12 are adapted to receive a stator winding, discussed in more detail below. A radial inward direction is defined as moving towards the central axis 18 of the stator core 10 and a radial outward direction is defined as moving away from the central axis 18. The core slots 12 may have rectangular cross sectional shape as can be seen in FIG. 1.

Figure 2:
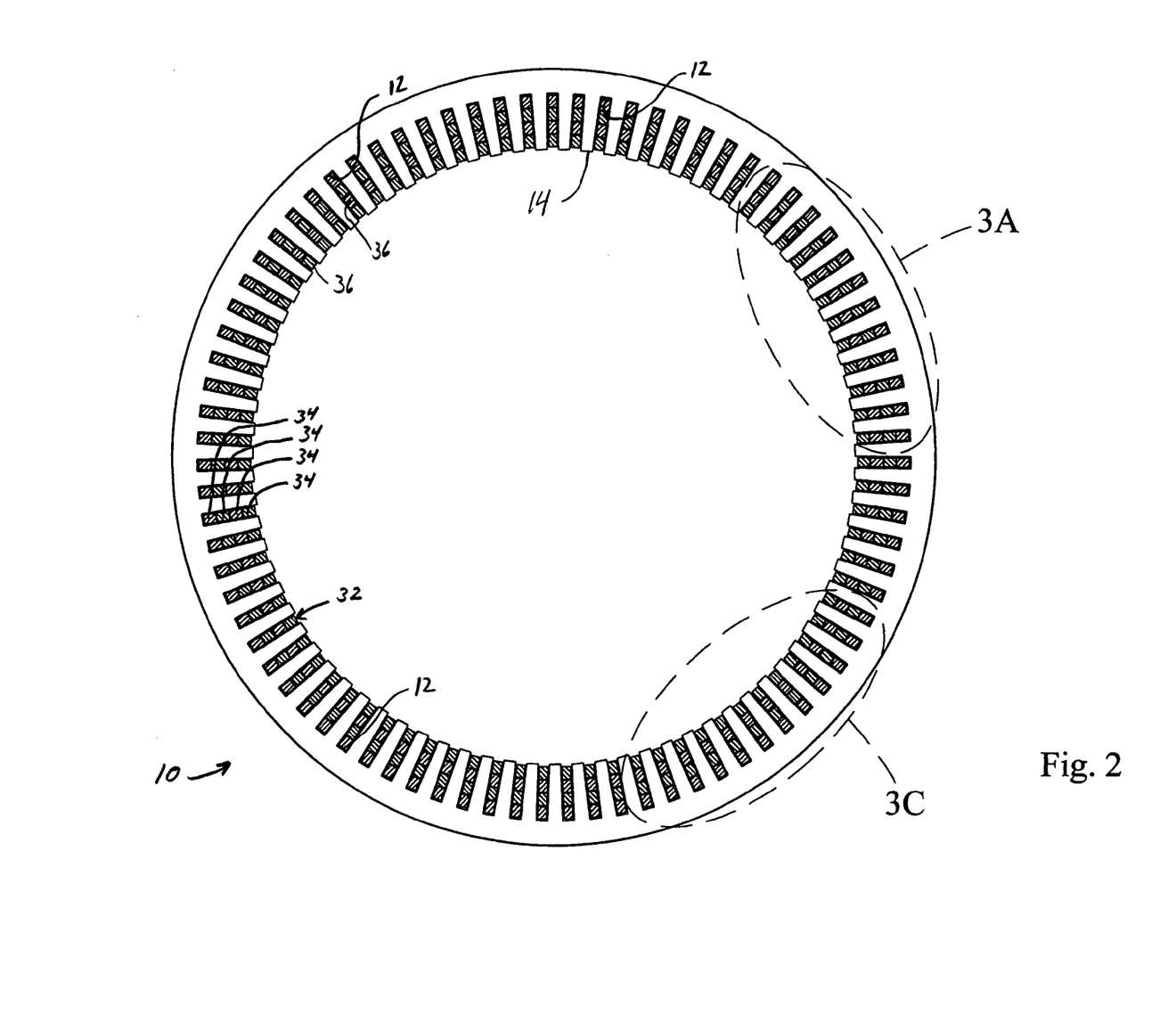
FIG. 2 is a cross sectional view of a stator core having a plurality of windings positioned within the slots of the core.

Referring to FIG. 2, a cross sectional view of a stator core 10 having a stator winding 32 positioned within the slots 12 is shown. The winding 32 has a plurality of phases, N. Each phase is defined by a conductor 34. Each conductor 34 has a plurality of slot segments 36 housed in the core slots 12. The slot segments 36 are alternately connected at the first and second ends 20, 22 of the stator core 10 by a plurality of end loop segments 38, shown in FIG. 3B.

At least one conductor 34 includes at least one slot segment 36 that is switched with the slot segment 36 of an adjacent conductor. By switching the slot segments 36 of two adjacent conductors 34 the end loop segment 38 of one of the conductors 34 has a pitch equal to N+1 and the end loop segment of the adjacent conductor 34 has a pitch equal to N−1. In this way, the end loop segments of the two conductors 34 do not cross one another.

Figure 3A:
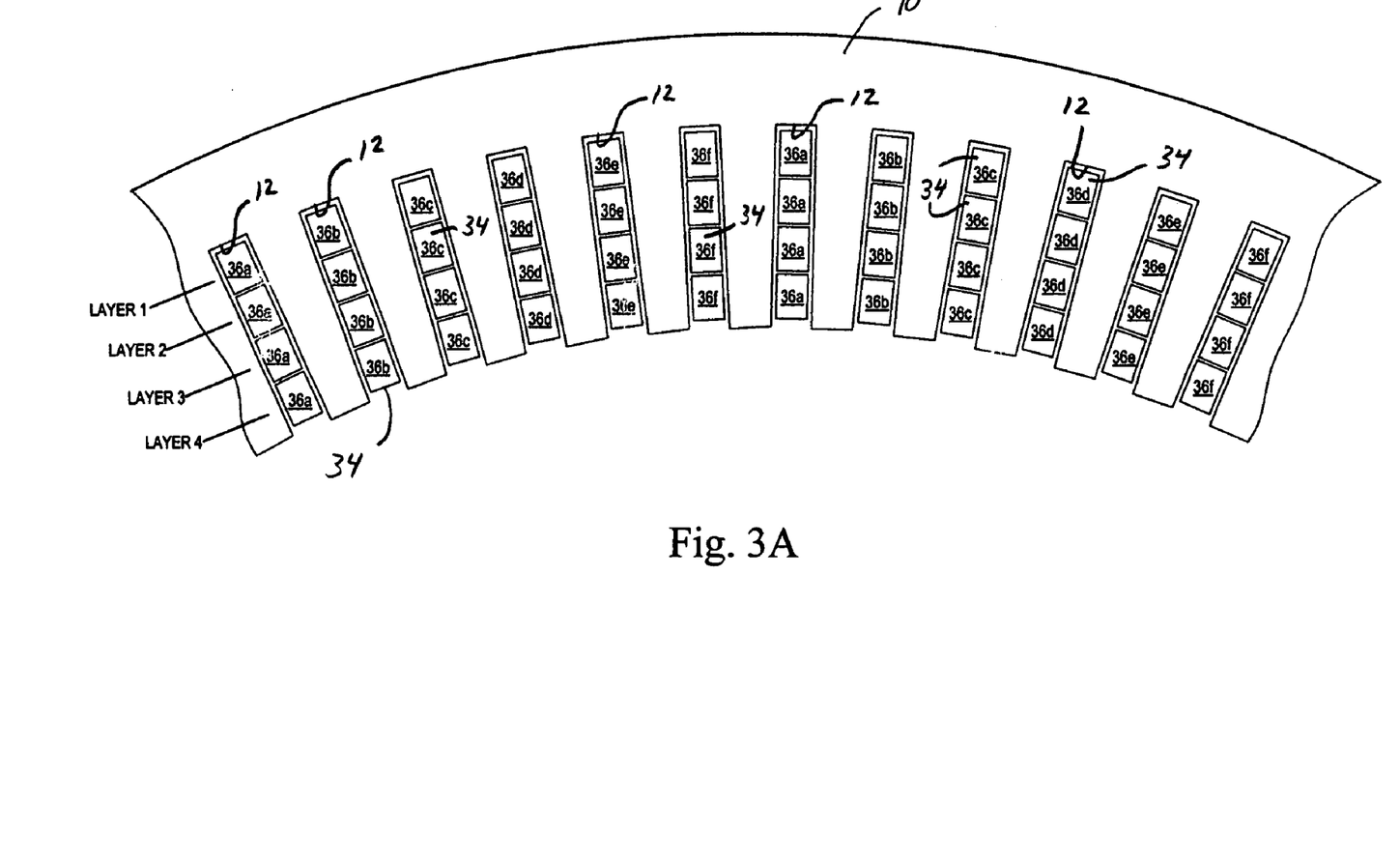
FIG. 3A is a partial view of the stator generally encircled by line 3A in FIG. 2.
Figure 3B:
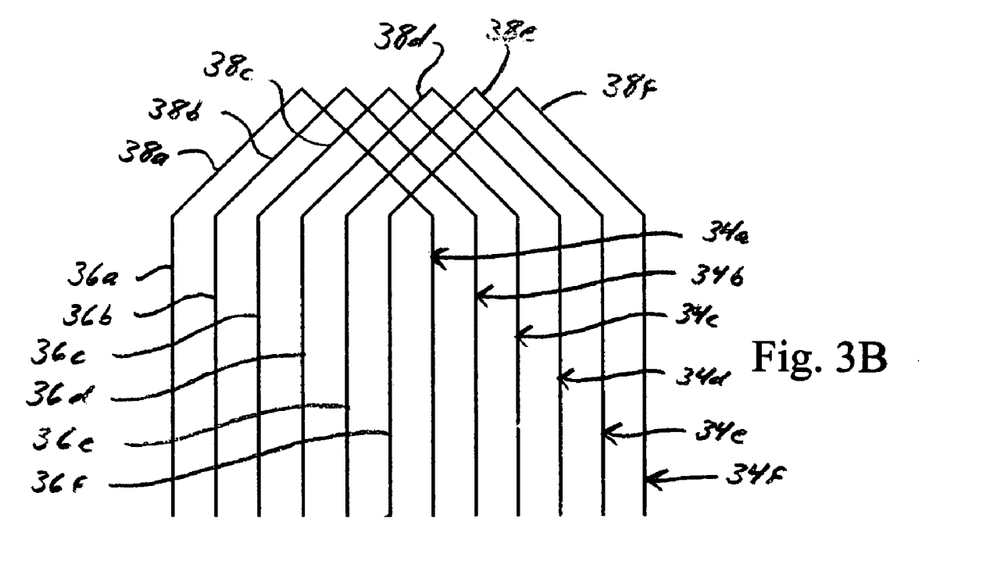
FIG. 3B is a schematic representation of the conductors of the portion of the stator seen in FIG. 3A.

Referring again to FIG. 2, the stator 10 shown includes six conductors 34 that define six phases of the stator winding 32. The stator winding 32 forms four layers within the stator core 10. Referring to FIGS. 3a and 3b, the slot segments 34 of the phases are placed within the slots 12 of the stator core 10 sequentially. The six conductors 34a-34f extend around the stator core in a repeating pattern. FIG. 3b illustrates how the end loop portions 38a-38f of the conductors 34a-34f all cross one another in cascaded fashion.

In FIGS. 3a and 3b the pitch, N, of all the conductors 34a-34f is six. The pitch is the distance that the end loop segments 38a-38f span between adjacent slot segments 36a-36f of the same conductor 34a-34f.

Figure 3C:
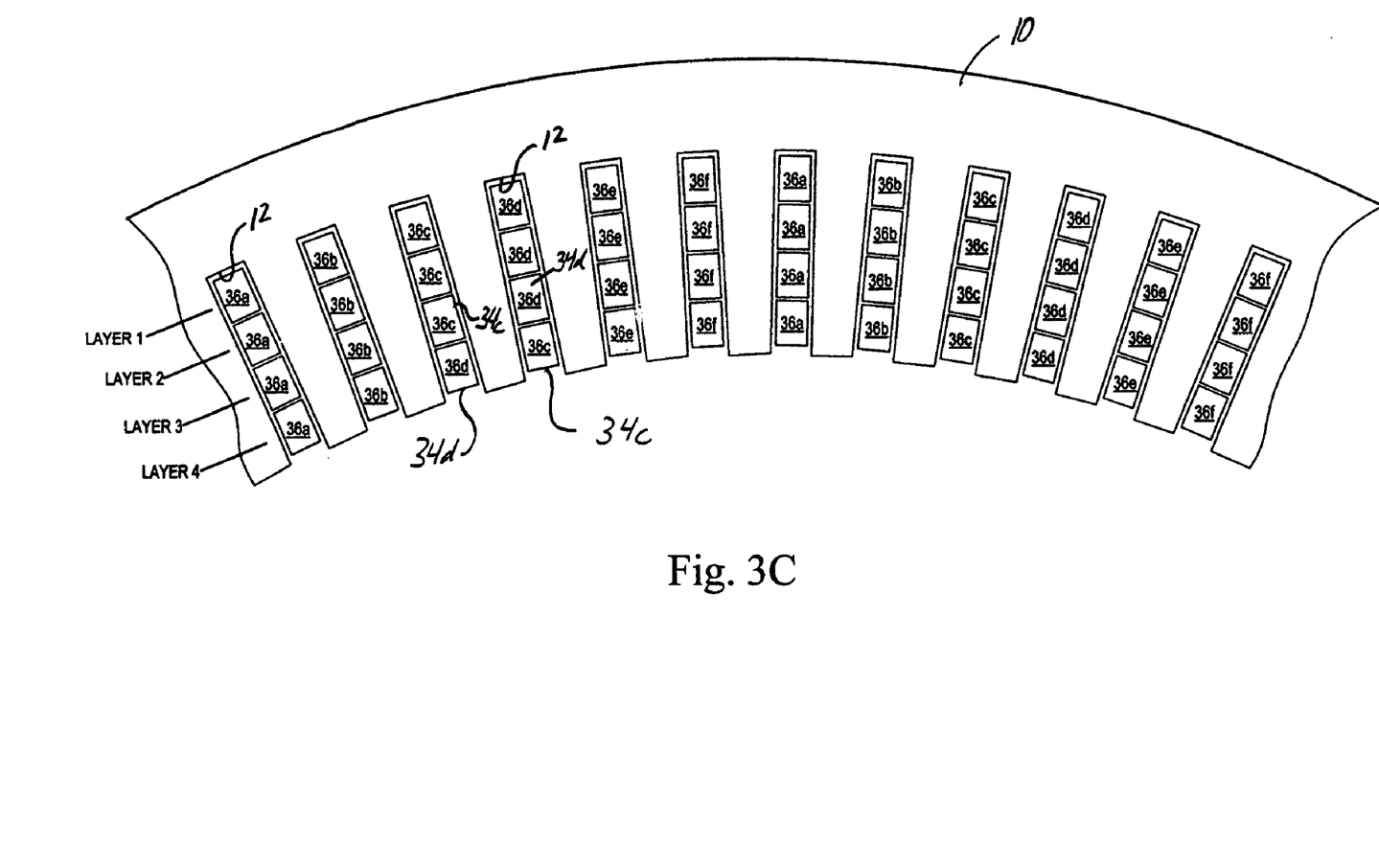
FIG. 3C is a partial view of the stator generally encircled by line 3C in FIG. 2.
Figure 3D:
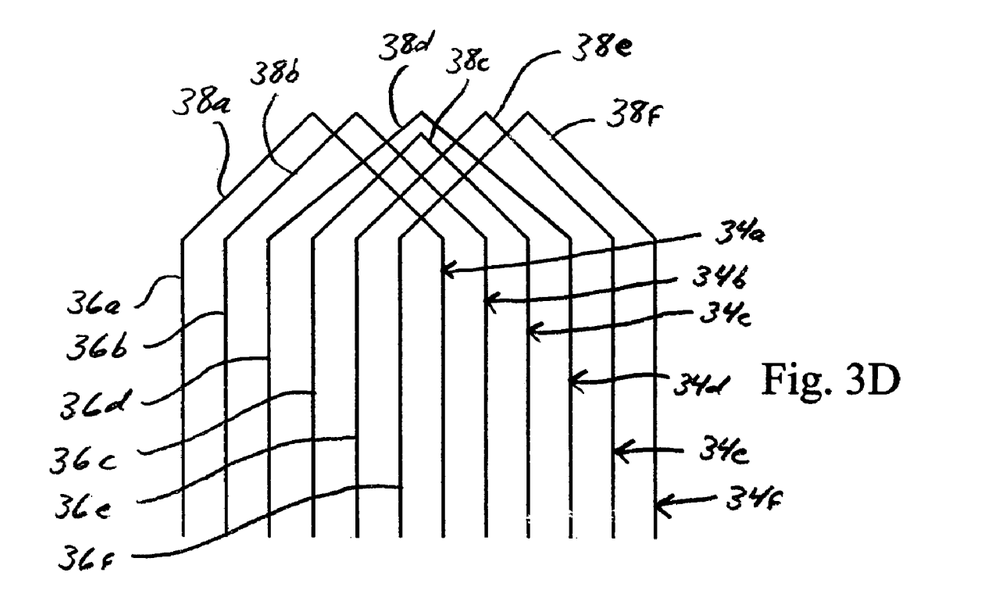
FIG. 3D is a schematic representation of the conductors of the portion of the stator seen in FIG. 3C.

Referring to FIG. 3c, a different portion of the stator shown in FIG. 2 is shown. The slot segments 36c and 36d of conductors 34c and 34d in the fourth layer of the winding 32 are switched with one another. Referring to FIG. 3d, because the slot segments 36c, 36d of the two adjacent conductors 34c, 34d are switched, the end loop segments 38c, 38d of those two conductors 34c, 34d do not cross one another. The remaining end loop segments 38a, 38b, 38e, 38f are all identical to those shown in FIG. 3b.

The result of this switching of the conductors 34c, 34d is that as the poles of the rotor (not shown) rotate relative to the stator, the switched conductors 34c and 34d will be energized in a different order at that point. Throughout the remaining portion of the stator, all of the conductors 34a-34f will be energized in sequence with a thirty electrical degree phase shift. When the two conductors 34c, 34d are energized in the different order, the phase shift between them at that instant is reversed. Because of that instance where two conductors 34c, 34d are energized in reverse, the overall phase shift of the stator is something less than thirty electrical degrees.

The conductors 34a, 34b, 34e, and 34f have a pitch of six, similar to those shown in FIGS. 3a and 3b. However, the switched conductors 34c and 34d have different pitches.

Conductor 34c has a pitch equal to N-1, or five and the adjacent conductor 34d has a pitch equal to N+1, or seven. Conductor 34d has an end loop segment 38d that spans seven slots 12 within the stator core 10. The adjacent conductor 34c has an end loop segment 38c that spans five slots 12 within the stator core 10. The pitch is the distance that the end loop segments 38a-38f spans between adjacent slot segments 36a-36f of the same conductor 34a-34f.

The stator winding 32 could include more than one switching of adjacent conductors. Each additional switching results in the phase shift becoming smaller and moving away from thirty electrical degrees. By definition the phase shift can never be equal to zero, because the conductors would no longer switched. To reduce noise issues, the locations of switching conductors 34 can be spaced circumferentially around the stator core 10. To further reduce the noise issues, the locations of the switched conductors 34 can be spaced unevenly around the stator core 10.

Figure 4:
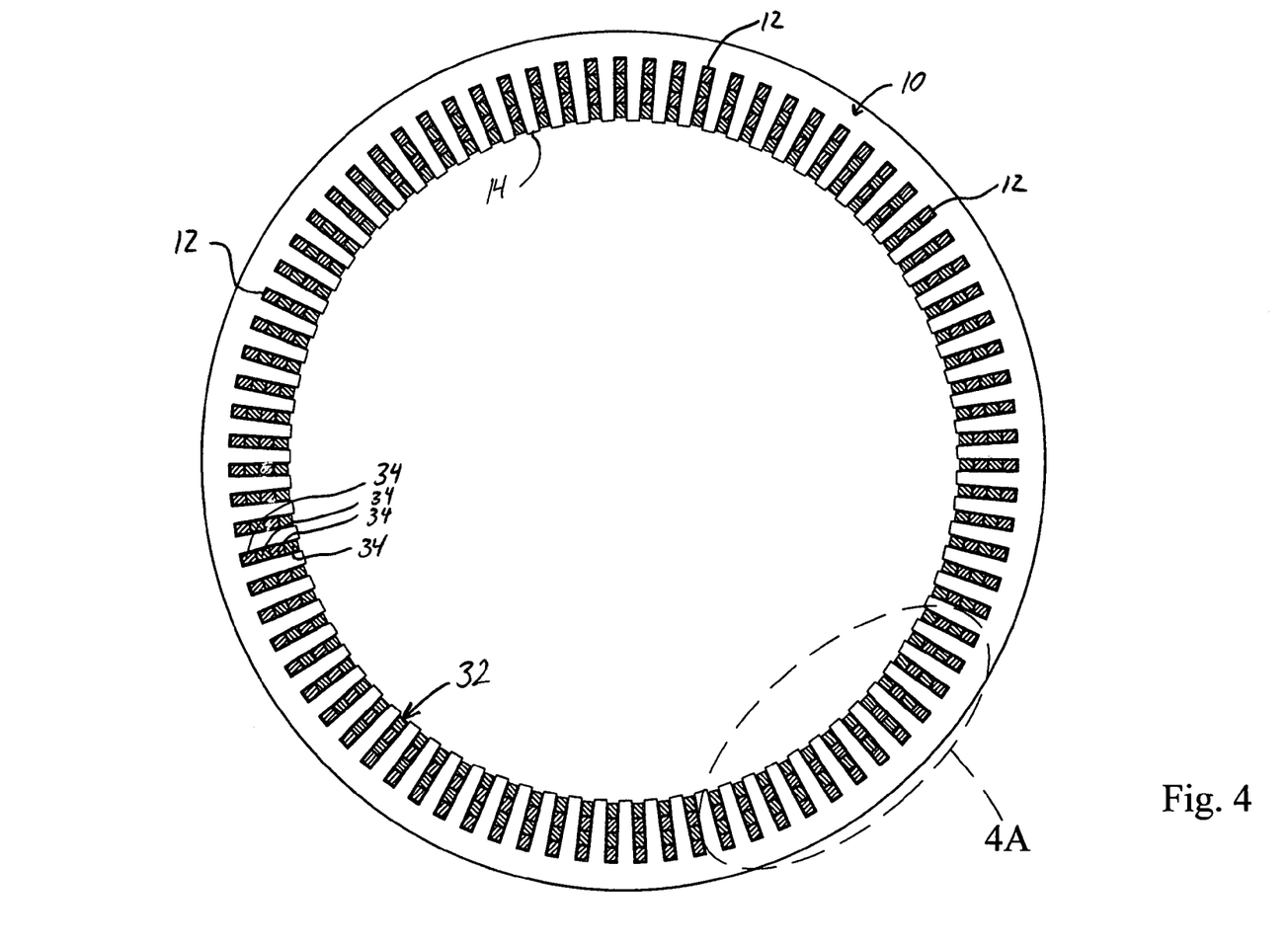
FIG. 4 is a cross sectional view of a stator core having a plurality of windings positioned within the slots of the core.
Figure 4A:
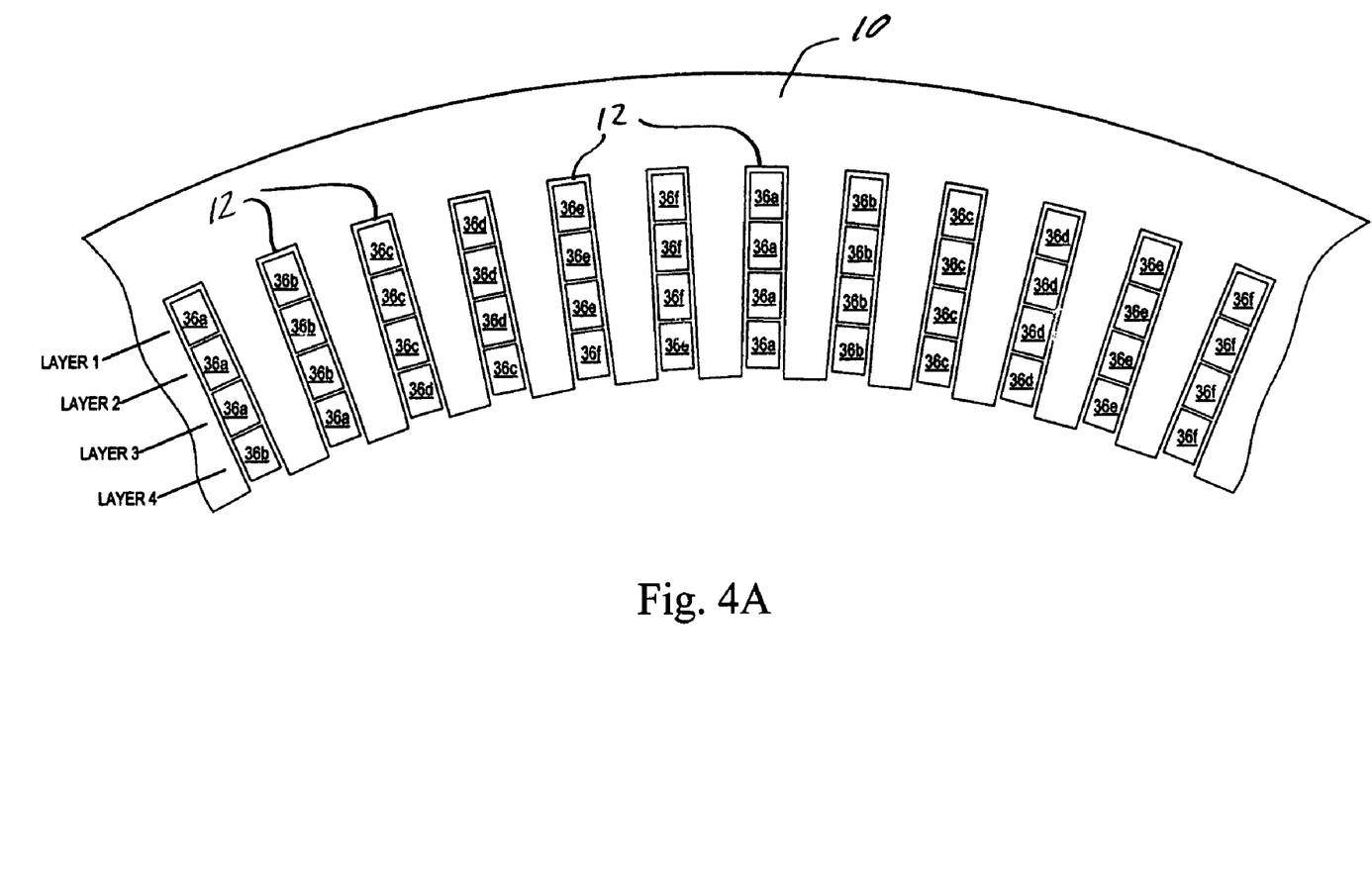
FIG. 4A is a partial view of the stator generally encircled by line 4A in FIG. 4.
Figure 4B:
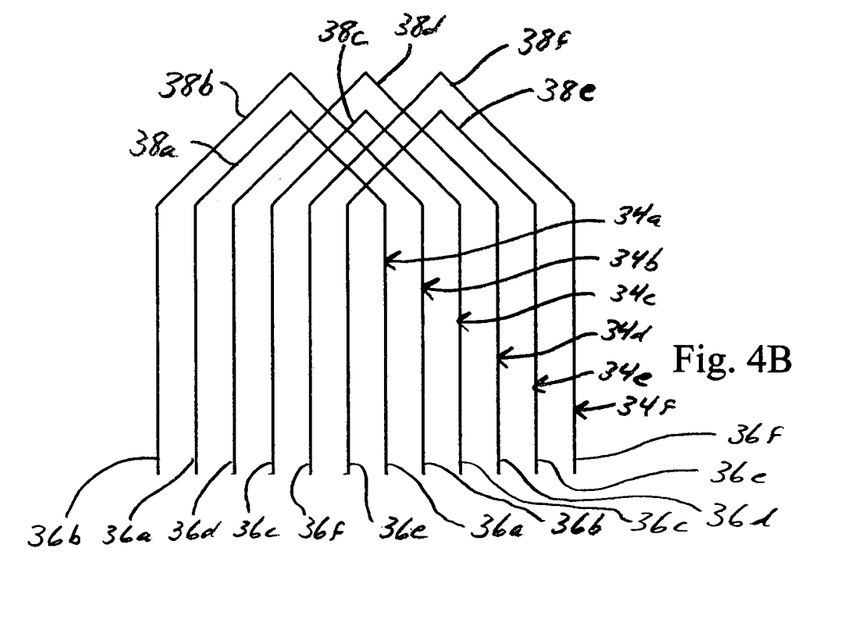
FIG. 4B is a schematic representation of the conductors of the portion of the stator seen in FIG. 4A.

Referring to FIGS. 4, 4a, and 4b, a stator core 10 and stator winding 32 are shown wherein each of the conductors 34a-34f of layer 4 include a slot segment 36a-36f that is switched with the slot segment 36a-36f of an adjacent conductor 34a-34f. By switching the slot segments 36a and 36b with one another, 36c and 36d with one another, and 36e and 36f with one another, the end loop segments 38a, 38c, and 38e of conductors 34a, 34c, and 34e have a pitch equal to N-1, or five, and the end loop segments 38b, 38d, and 38f of the adjacent conductors 34b, 34d, and 34f have a pitch equal to N+1, or seven. In this way, the end loop segments 38a, 38b do not cross one another, end loop segments 38c, 38d do not cross one another, and end loop segments 38e, 38f do not cross one another, as shown in FIG. 4b.

Figure 5:
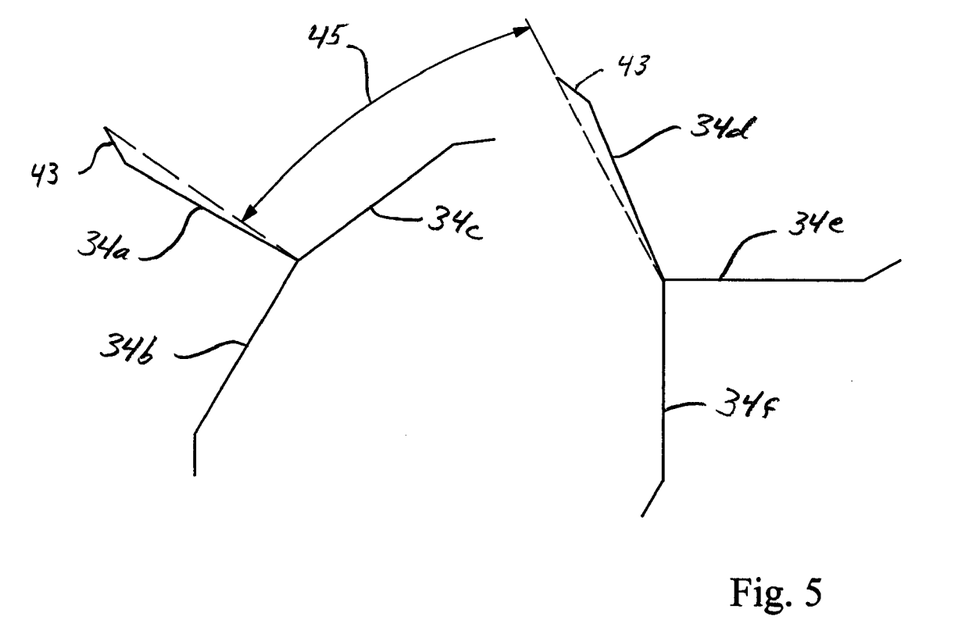
FIGS. 5 and 5A are schematic representations of the windings of a stator core, in accordance with the present invention, wherein the windings are connected in a wye configuration.
Figure 5A:
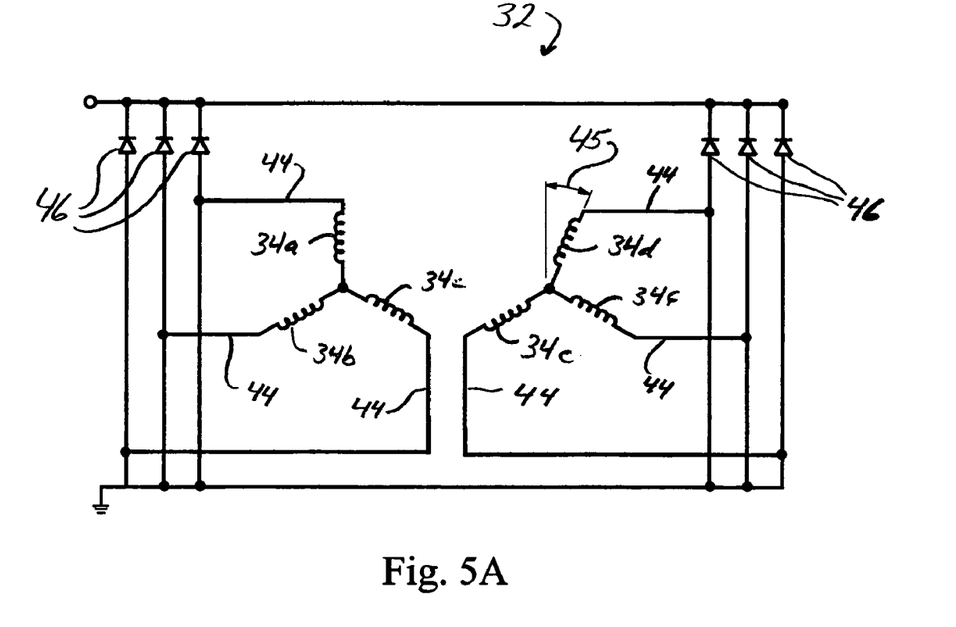
Figure 6:
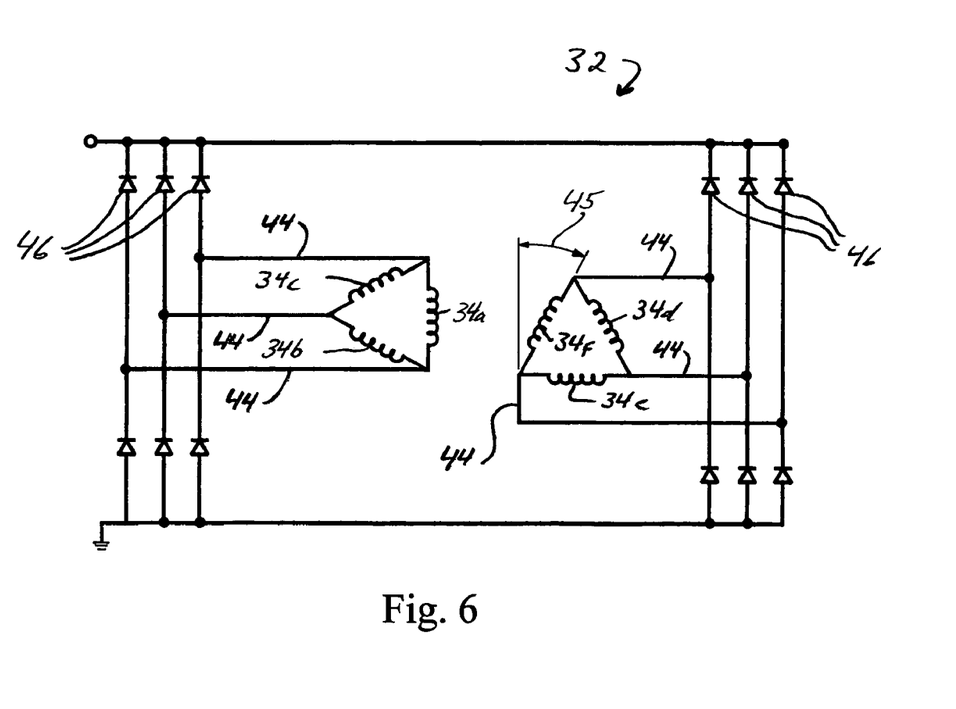
FIG. 6 is a schematic representation of the windings of a stator core, in accordance with the present invention, wherein the windings are in a delta configuration.

Referring to FIGS. 5 and 5a, a schematic diagram of a stator winding 32 is shown, wherein the conductors 34a-34f are connected to one another in a wye configuration. Each conductor 34a-34f includes a slot segment 36a-36f that is switched with an adjacent slot segment 36a-36f. The switching of the slots segments 36a-36f of the conductors 34a-34f results in a slight negative phase shift, shown schematically at 43, which makes the overall phase shift 45 something less than thirty degrees. Referring to FIG. 6, the conductors 34a-34f can also be connected to one another in a delta configuration. In each case, the terminals 44 of the conductors 34a-34f are connected to rectifying diode pairs 46.

Figure 7:
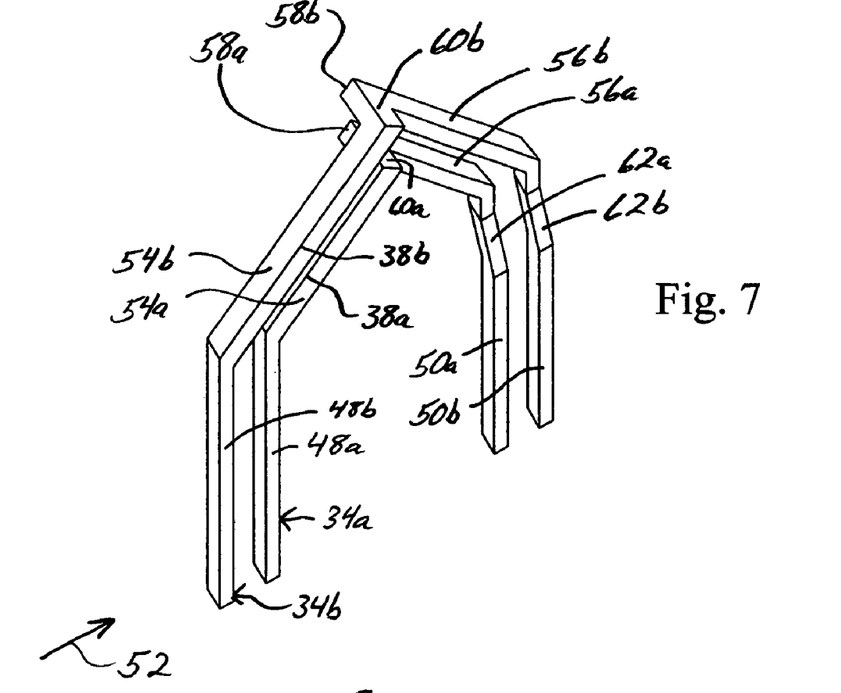
FIG. 7 is a perspective view of a pair of end loop segments of a portion of a stator winding in accordance with the present invention.

The conductors 34a-34f are preferably formed as a cascaded winding 32. The cascaded winding 32 for the stator is shown in FIGS. 7 through 7c. Each of the continuous conductors 34 has a plurality of slot segments 36 disposed in the core slots 12. The term continuous, utilized herein, refers to a conductor 34 including at least two end loop segments 38 and connected to at least three slot segments 36 that extend circumferentially around the core 10 without any welds or connections.

The slot segments 38 are alternately connected at the first and second ends 20, 22 of the stator core 10 by the end loop segments 38. Each of the slot segments 36 of a particular layer are located in the same radial position and therefore are likely to be at substantially the same radial distance from the central axis 18 of the stator core 10 and the end loop segments 38 form a cascaded winding pattern.

Referring now to FIG. 7, the end loop segments 38a, 38b of two conductors are adapted to be a part of the stator winding 32. Each conductor 34a, 34b includes a first substantially straight end portion 48a, 48b and a second substantially straight end portion 50a, 50b that are each proximate to a respective slot segment, discussed in more detail below, of the stator winding 32. The first end portions 48a, 48b and the second end portions 50a, 50b of the end loop segments 58a, 58b are at a substantially same radial distance from the central axis 18 of the stator core 10. The first end portions 48a, 48b and the second end portions 50a, 50b form a portion of a layer, indicated generally at 52, of the stator winding 32 whose slot segments 36 are located in the same radial position in the core slots 12. Although the end portions 48a, 48b, 50a, 50b are described as entities, they may, in fact, just be portions of the slot segments 36a, 36b, discussed in more detail below.

Each end loop segment 38a, 38b includes a first sloped portion 54a, 54b and a second sloped portion 56a, 56b that meet at an apex portion 58a, 58b. The first sloped portions 54a, 54b are substantially co-radial with the slot segments 36 of the layer 52, the first end portions 48a, 48b and the second end portions 50a, 50b. The second sloped portions 56a, 56b are substantially non-co-radial with the slot segments 36 of the layer 52, the first end portions 48a, 48b and the second end portions 50a, 50b. Each apex portion 58a, 58b includes a first radial extension portion 60a, 60b. The first radial extension portions 60a, 60b extend from the first sloped portions 54a, 54b in the radially outward direction, which provides a radial outward adjustment for the end loop segments 38a, 38b. Second radial extension portions 62a, 62b connect the second sloped portions 56a, 56b and the second end portions 50a, 50b. The second radial extension portions 62a, 62b extend from the second sloped portions 56a, 56b in the radially inward direction, which provides a radial inward adjustment for the end loop segments 38a, 38b. Although the radial extension portions 60a, 60b, 62a, 62b shown in FIGS. 7, 7a, 7b, and 7c appear as sharp bends, it is obvious to those skilled in the art that typical radial extension portions would be more gentle in nature and include radii, not shown.

While the end loop segments 38a, 38b have been shown wherein the radial outward adjustment is adjacent the apex portions 58a, 58b and the radial inward adjustment is adjacent the second sloped portions 62a, 62b, those skilled in the art can appreciate that the radial outward and inward adjustments can be on any one or on any two of the first sloped portions 54a, 54b, the second sloped portions 56a, 56b, and the apex portions 58a, 58b in order to provide the cascaded winding pattern, described in more detail below.

Figure 7A:
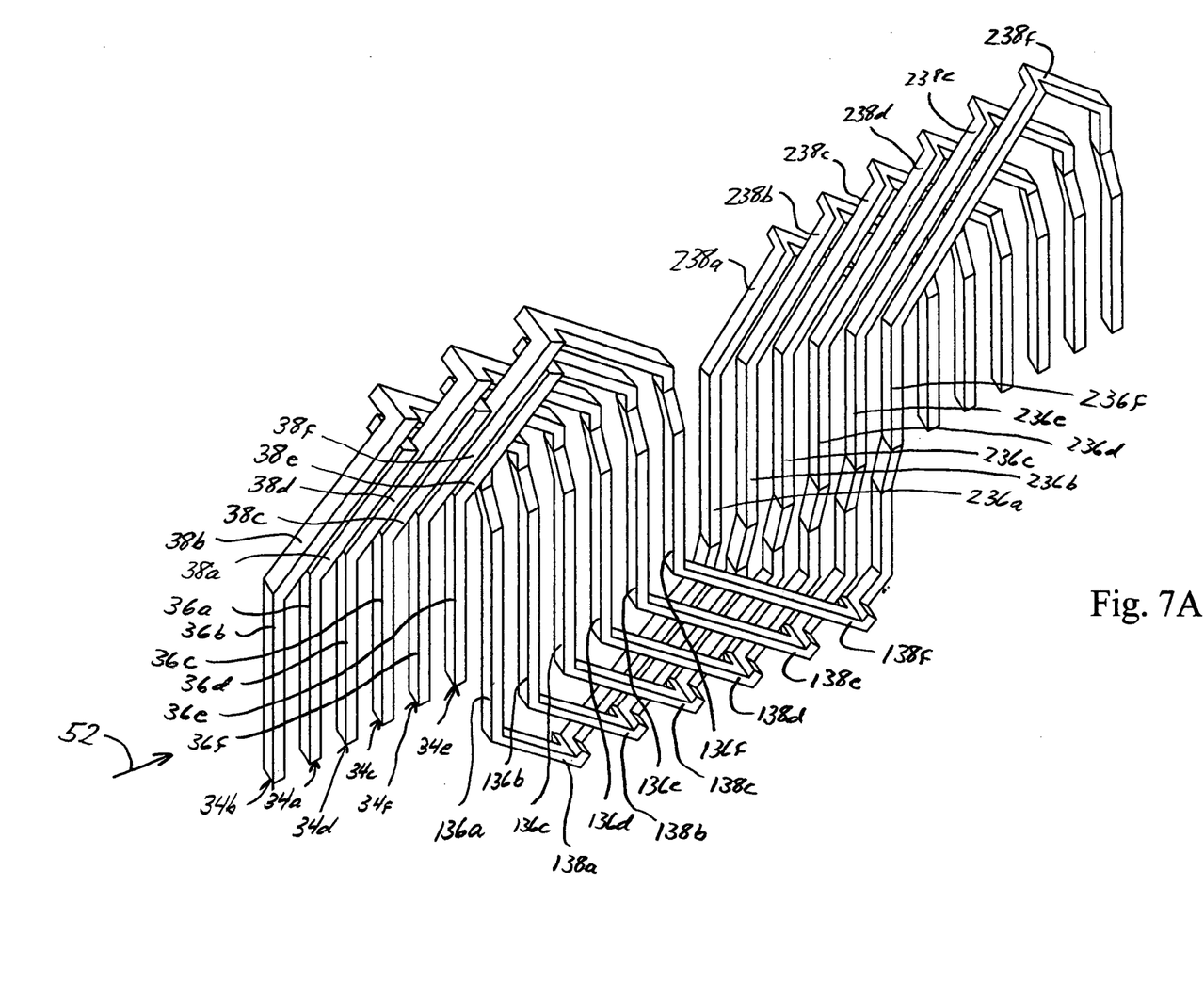
FIG. 7a is a perspective view of a layer of end loop segments of a portion of a stator winding in accordance with the present invention including the end loop segments of FIG. 7.

Referring now to FIG. 7a, the end loop segments 38a, 38b of FIG. 7 are shown adjacent four identical end loop segments 38c, 38d, 38e, and 38f. The end loop segments 38a-38f each form a portion of the layer 52 of the stator winding 32. The end loop segments 38a-38f are shown with slot segments 36a and 36b switched, 36c and 36d switched, and 36e and 36f switched as shown in FIGS. 4, 4a, and 4b. The end loop segments 38a, 38c, 38e of conductors 34a, 34c, 34e have a pitch equal to five, as can be best seen in FIG. 7a where the end loop segments 38a, 38c, 38e connect slot segments 36a, 36c, 36e with slot segments 136a, 136c, 136e disposed in core slots which are located five core slots away. The end loop segments 38b, 38d, and 38f of conductors 34b, 34d, 34f have a pitch equal to seven, wherein the end loop segments 38b, 38d, 38f connect slot segments 36b, 36d, 36f with slot segments 136b, 136d, 136f disposed in core slots which are located seven core slots away.

The slot segments 136a-136f extend through the core slots 12 to the second end 22 of the stator core 10. The slot segments 136a-136f exit the second end 22 and attach to end loop segments 138a-136f which are described in more detail below. The end loop segments 138a-138f are attached at another end to slot segments 236a-236f. The slot segments 236a-236f extend upwardly through another six core slots 12 of the stator core 10 and attach to end loop segments 238a-238f.

After the switching of the slot segments 36a-36f as described above, the slot segments 136a-136f are positioned sequentially within the stator core. The slot segments 136a-136f are not switched, therefore, the end loop segments 138a-138f will all cross as shown in FIG. 7a like the remainder of the stator winding. Likewise, the slot segments 236a-236f are positioned sequentially, and not switched, such that the end loop segments 238a-238f all cross one another as shown in FIG. 7a. The remainder of the stator winding continues in this way, in cascaded fashion.

Preferably, each of the slot segments 36a-36f, 136a-136f, and 236a-236f and each of the end loop segments 38a-38f, 138a-138f, and 238a-238f are formed from a rectangular wire and have a cross-sectional shape having a substantially constant circumferential width and radial width and therefore substantially equal area, however, other shapes could also be employed such as round, triangular or elliptical. For those skilled in the art, it is known that a square shaped conductor is considered a type of a rectangular shaped conductor and that a typical rectangular conductor may include radii on the corners intermediate two adjacent edges.

Figure 7B:
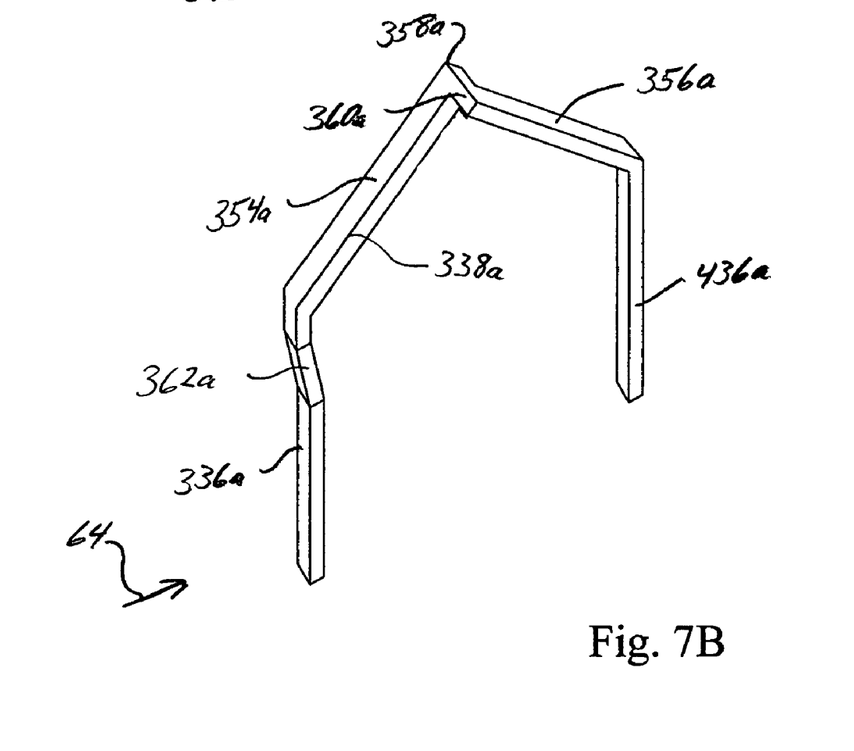
FIG. 7b is a perspective view of a pair of end loop segments similar to the pair shown in FIG. 7 but from a different layer within the stator core.
Figure 7C:
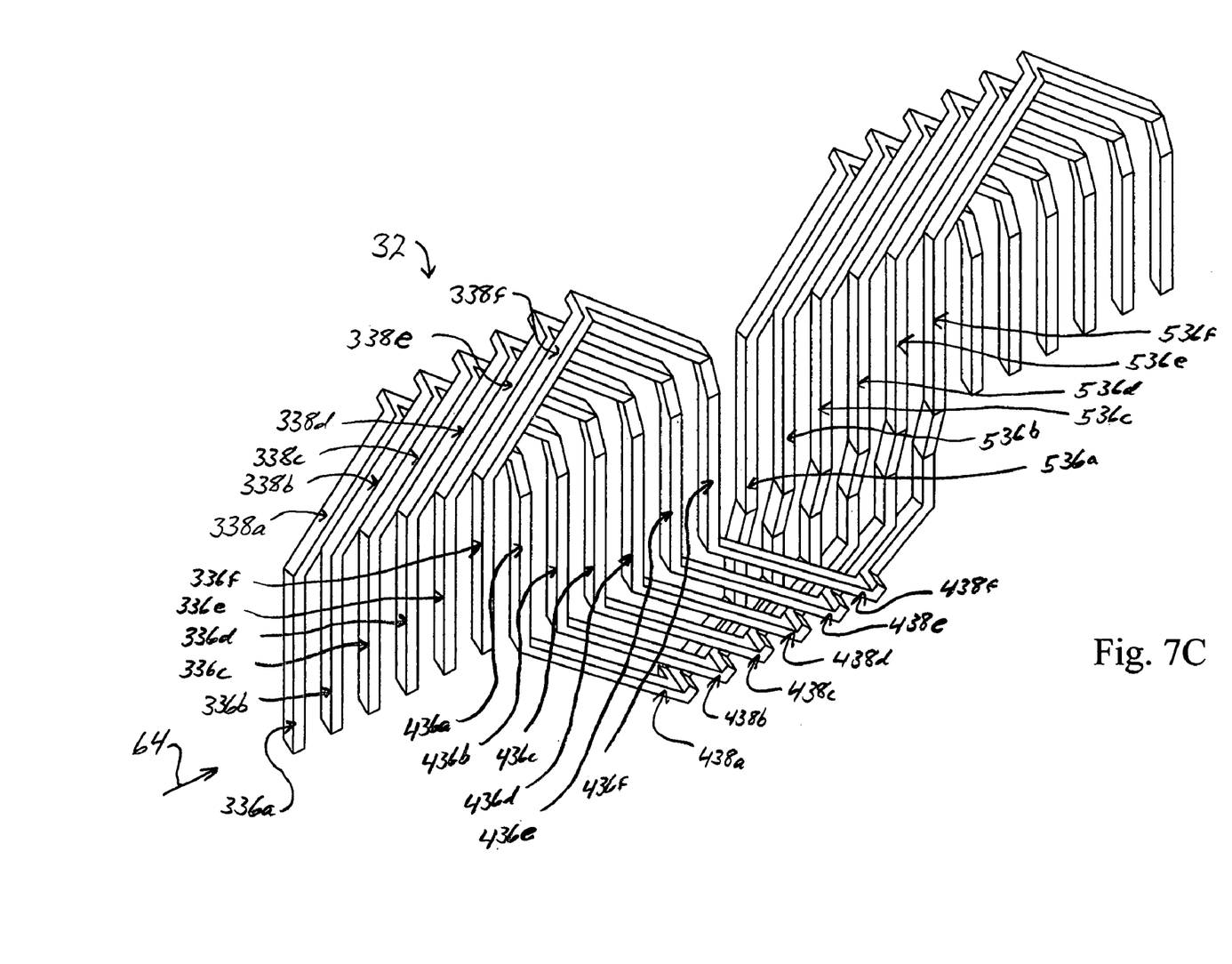
FIG. 7c is a perspective view of a layer of end loop segments of a portion of a stator winding in accordance with the present invention including the end loop segments of FIG. 7b.

Referring now to FIG. 7b, an end loop segment from a second layer 64 of the stator winding 32 is shown. The end loop segment 338a includes a first sloped portion 354a and a second sloped portion 356a connected by an apex portion 358a. The first sloped portion 354a is substantially co-radial with the slot segments 336a and 436a of the second layer 64. The second sloped portion 356a is substantially non-co-radial with the slot segments 336a, 436a of the second layer 64. The apex portion 358a includes a first radial extension portion 360a. The first radial extension portion 360a extends from the first sloped portion 354a in the radially outward direction, which provides a radial outward adjustment for the end loop segment 358a. A second radial extension portion 362a connects the second sloped portion 356a and the slot segment 336a. The second radial extension portion 362a extends from the second sloped portion 356a in the radially inward direction, which provides a radial inward adjustment for the end loop segment 358a.

Referring now to FIG. 7c a second layer 64 of the stator winding 32 is shown. The second layer 64 is located radially inward of the first 52 at a predetermined radial distance from the first layer 52. The second layer 64 includes end loop segments 338a-338f. The conductors of the second layer 64 including the end loop segments 338a-338f are similar to the conductors of the first layer 52 including the end loop segments 38a-38f, 138a-138f, and 238a-238f, except that they are inserted into the core slots 12, shifted by a predetermined number of slots, discussed in more detail below. Further, the end loop segments 338a-338f of the second layer extend radially outwardly at the apex portion in the counterclockwise direction 26, which is opposite the end loop segments 38a-38f, 138a-138f, and 238a-238f of the first layer 52, which extend radially outwardly at the apex 58 in the clockwise direction 24.

The end loop segments 338a-338f each form a portion of the second layer 64 of the stator winding 32. The end loop segments 338a-338f are shown in a six-phase winding pattern. In a this six-phase winding 32 the end loop segments 338a-338f have a pitch equal to six, as can be best seen in FIG. 7c where the end loop segments 338a-338f connect to slot segments 336a-336f with other slot segments 436a-436f disposed in core slots 12 which are located six core slots 12 away. The second layer of the stator winding 32 is shown without any switching of the slot segments 36 to illustrate how a portion of the first layer 52 having switched slot segments 36a-36f is cascaded next to a second layer 64 wherein the slot segments 336a-336f are not switched.

The slot segments 436a-436f extend through the core slots 12 to the second end 22 of the stator core 10. The slot segments 436a-436f exit the second end 22 and attach to end loop segments 438a-438f which are described in more detail below. The end loop segments 438a-438f are attached at another end to slot segments 536a-536f. The pattern of connecting end loop segments 38 and slot segments 36, as outlined above, continues about the circumference of the stator core 10 to form the second layer 64 of the stator winding 32.

Preferably, each of the slot segments 36a-36f, 136a-136f, 236a-236f, 336a-336f, 436a-436f, and 536a-536f and each of the end loop segments 38a-38f, 138a-138f, 238a-238f, 338a-338f, and 438a-438f are formed from a rectangular wire and have a cross-sectional shape having a substantially constant circumferential width and radial width and therefore substantially equal area, however, other shapes could also be employed such as round, triangular or elliptical. For those skilled in the art, it is known that a square shaped conductor is considered a type of a rectangular shaped conductor and that a typical rectangular conductor may include radii on the corners intermediate two adjacent edges.

When the first and second layers are cascaded with one another, the non-co-radial portions of the end loop segments 338a-338f, 438a-438f extend radially outward where they become substantially co-radial with the slot segments 36a-36f, 136a-136f, and 236a-236f of the first layer 52, but because they are shifted by a predetermined number of slots, they do not violate the space of the end loop segments 38a-38f, 138a-138f, and 238a-238f of the first layer 52. This allows the end loop segments of the two layers, 52 and 64 to cascade together forming a two layer winding 32, which extends radially outward by one substantial wire width beyond the slot segments of the first layer 52 but does not substantially extend radially inward beyond the slot segments of the innermost layer.

For a winding with a plurality of layers, a third layer (not shown) which is substantially identical to the first layer 52, would have non-co-radial portions that would extend radially outward and be substantially co-radial with the slot segments 336a-336f, 436a-436f, 536a-536f of the second layer 64 and therefore cascade with the second layer 64. For a pattern where the radial layers alternate between being substantially identical with the first layer 52 and the second layer 64, a pattern develops where the winding 32 only extends radially outward by one wire width for the outermost layer 52 but not radially inward of the slot segments of the innermost layer. This cascading effect allows a winding 32 with a plurality of layers to be inserted into a stator core 10, that extend radially outwardly by one substantial wire width while not extending radially inwardly.

While the slot segments 36a-36f, 136a-136f, 236a-236f, 336a-336f, 436a-436f, and 536a-536f are shown generally coplanar in FIGS. 7a-7c for illustrative purposes, the slot segments 36a-36f, 136a-136f, 236a-236f, 336a-336f, 436a-436f, and 536a-536f are preferably adapted to be received by a radially curved surface, such as the interior surface of the stator core 10 and, therefore, are not coplanar but are co-radial. The width of each of the slot segments 36a-36f, 136a-136f, 236a-236f, 336a-336f, 436a-436f, and 536a-536f, including any insulation, preferably fits closely to the width of the core slots 12, including any insulation.

Figure 8:
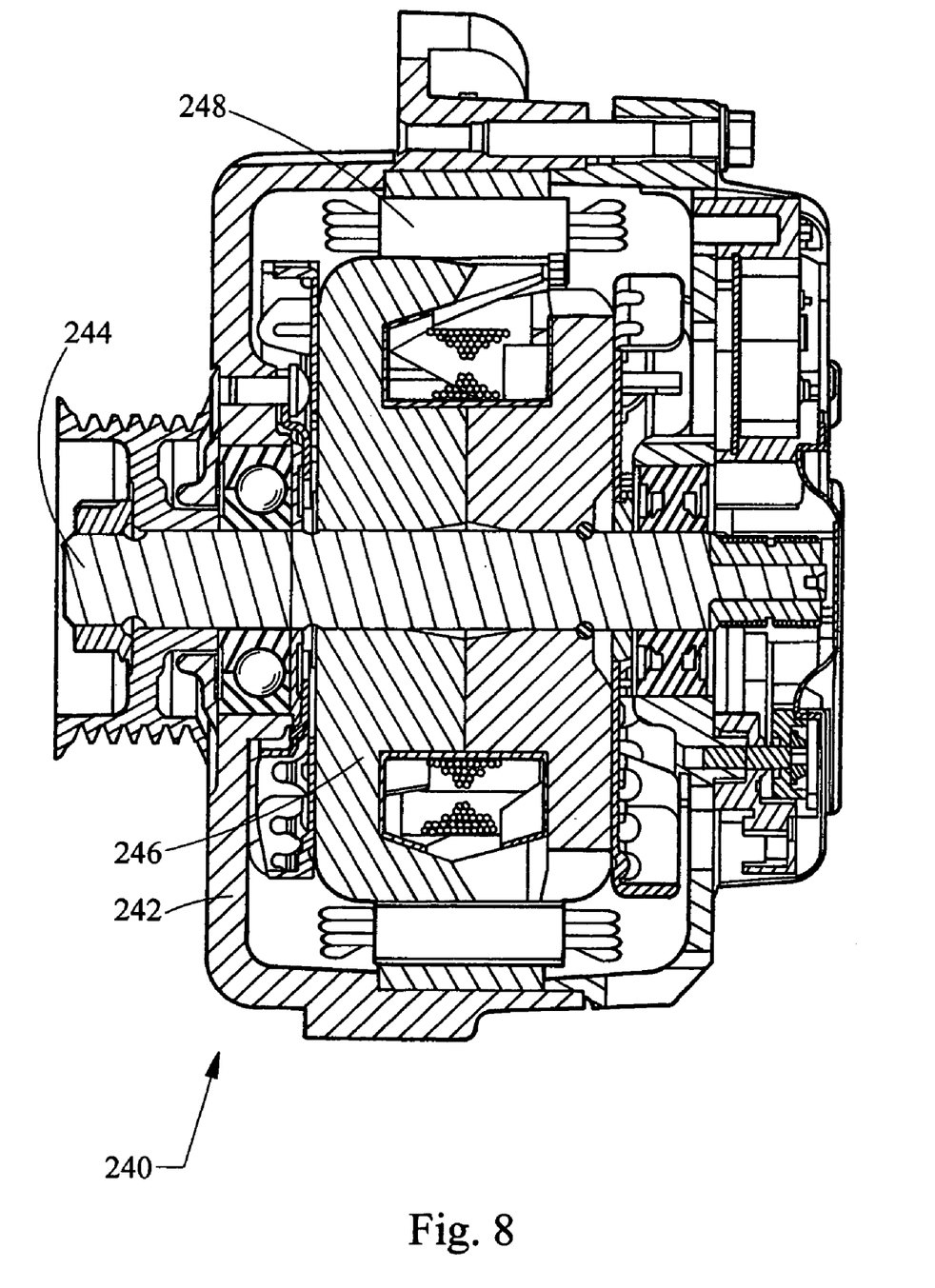
FIG. 8 is a cross sectional view of an alternator in accordance with the present invention.

Referring now to FIG. 8, a dynamoelectric machine in accordance with the present invention is indicated generally at 240. The dynamoelectric machine 240 is preferably an alternator, but those skilled in the art will appreciate that the dynamoelectric machine 240 can be, but is not limited to, an electric motor, a starter-generator, or the like. The dynamoelectric machine 240 includes a housing 242 having a shaft 244 rotatably supported by the housing 242. A rotor assembly 246 is supported by and adapted to rotate with the shaft 244. The rotor assembly 246 can be, but is not limited to, a "claw pole" rotor, a permanent magnet non claw pole rotor, a permanent magnet claw pole rotor, salient field wound rotor, or an induction type rotor. A stator assembly 248 is fixedly disposed in the housing 242 adjacent the rotor assembly 246. The stator assembly 248 includes a stator core, such as the stator core 10 and a winding, such as the stator winding 50.

In accordance with the provisions of the patent statutes, the present invention has been described in what is considered to represent its preferred embodiment. However, it should be noted that the invention can be practiced otherwise than as specifically illustrated and described.

What is claimed is:

1. A stator for an electric machine, comprising:
   a generally cylindrically-shaped stator core having a plurality of circumferentially-spaced and axially-extending core teeth that define a plurality of circumferentially-spaced and axially-extending core slots in a surface thereof, the core slots extending between a first and a second end of the stator core; and
   a stator winding having a plurality, N, of phases, each phase including a conductor having a plurality of slot segments housed in the core slots, the slot segments alternately connected at the first and second ends of the stator core by a plurality of end loop segments;
   at least one conductor having at least one slot segment that is switched with an adjacent conductor such that the at least one conductor has at least one end loop segment having a pitch equal to N+1 and the end loop segment of the adjacent conductor has a pitch equal to N−1, wherein the end loop segment of the at least one conductor and the end loop segment of the adjacent conductor do not cross one another.

2. The stator according to claim 1 wherein each conductor includes at least one slot segment that is switched with an adjacent conductor such that each conductor has at least one end loop segment having a pitch equal to N+1 and the end loop segment of the adjacent conductor has a pitch equal to N−1, such that the end loop segment of each conductor and the end loop segment of the adjacent conductor do not cross one another.

3. The stator according to claim 2 wherein the switched slot segments of one pair of switched conductors are circumferentially spaced around the stator core from the other switched slot segments of the other conductors.

4. The stator according to claim 3 wherein the switched slot segments are spaced un-evenly around the stator core.

5. The stator according to claim 1 wherein the at least one conductor includes a plurality of slot segments that are switched with adjacent conductors such that the at least one conductor has at least one end loop segment having a pitch equal to N+1 and at least one end loop segment having a pitch equal to N−1 and the at least one end loop segment of the adjacent conductor has a pitch equal to N−1 and at least one end loop segment of the adjacent conductor has a pitch equal to N+1, such that the end loop segments of the at least one conductor and the end loop segments of the adjacent conductors do not cross one another.

6. The stator according to claim 5 wherein the switched slot segments are spaced from one another circumferentially around the stator core.

7. The stator according to claim 6 wherein the switched slot segments are spaced un-evenly around the stator core.

8. The stator according to claim 1 wherein the conductors are connected to one another in a delta configuration.

9. The stator according to claim 1 wherein the conductors are connected to one another in a wye configuration.

10. The stator according to claim 1 wherein each terminal of the winding is connected to a diode pair.

11. The stator of claim 1 wherein the winding comprises six conductors defining six phases, wherein the conductors are connected to one another in one of a delta and a wye configuration and six terminals of the winding are connected to six diode pairs.

12. The stator according to claim 1 wherein at least a portion of the slot segments are inserted into the core slots of the generally cylindrically-shaped stator core in a substantially radial direction.

13. The stator of claim 1 wherein at least half of the end loop segments connect a first slot segment housed in a radial position of a first core slot with a second slot segment housed in the same radial position of a second core slot.

14. The stator of claim 13 wherein at least half of the end loop segments each include at least one substantially sloped portion.

15. The stator of claim 14 wherein at least half of the end loop segments each include at least two radial adjustments.

16. The stator according to claim 1 wherein the slot segments housed in the core slots are aligned in a radial row and have a rectangular cross section.

17. The stator according to claim 1 wherein a width of the slot segments, including any insulation, fits closely to the width of the core slots, including any insulation.

18. The stator according to claim 1 wherein the conductors further include at least one end loop segment having a pitch equal to N.

* * * * *